US011245310B2

(12) United States Patent
Takahashi et al.

(10) Patent No.: US 11,245,310 B2
(45) Date of Patent: Feb. 8, 2022

(54) MOTOR

(71) Applicant: NIDEC SERVO CORPORATION, Kiryu (JP)

(72) Inventors: Ryotaro Takahashi, Kiryu (JP); Koji Mizukami, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 148 days.

(21) Appl. No.: 16/643,602

(22) PCT Filed: Sep. 18, 2018

(86) PCT No.: PCT/JP2018/034334
§ 371 (c)(1),
(2) Date: Mar. 2, 2020

(87) PCT Pub. No.: WO2019/065339
PCT Pub. Date: Apr. 4, 2019

(65) Prior Publication Data
US 2020/0195099 A1 Jun. 18, 2020

(30) Foreign Application Priority Data
Sep. 29, 2017 (JP) .............................. JP2017-191857

(51) Int. Cl.
*H02K 9/22* (2006.01)
*H02K 5/22* (2006.01)
(Continued)

(52) U.S. Cl.
CPC ............... *H02K 9/227* (2021.01); *H02K 3/46* (2013.01); *H02K 5/22* (2013.01); *H02K 9/22* (2013.01); *H02K 11/30* (2016.01); *H02K 11/33* (2016.01)

(58) Field of Classification Search
CPC . H02K 11/40; H02K 5/04; H02K 3/52; H02K 3/46; H02K 11/33; H02K 5/225;
(Continued)

(56) References Cited

U.S. PATENT DOCUMENTS

| 2012/0025746 | A1* | 2/2012 | Kawakubo | ............. | H02K 11/33 |
| | | | | | 318/400.25 |
| 2014/0035405 | A1* | 2/2014 | Mao | ......................... | H02K 5/10 |
| | | | | | 310/71 |
| 2021/0139070 | A1* | 5/2021 | Tateyama | ................. | C09K 5/14 |

FOREIGN PATENT DOCUMENTS

| CN | 102414961 A | 4/2012 |
| CN | 203482025 U | 3/2014 |

(Continued)

OTHER PUBLICATIONS

Fujishima et al, Motor and Motor Manufacturing Method, Jan. 17, 2008, JP 2008011650 (English Machine Translation) (Year: 2008).*

(Continued)

*Primary Examiner* — Quyen P Leung
*Assistant Examiner* — Alexander A Singh
(74) *Attorney, Agent, or Firm* — Keating & Bennett

(57) ABSTRACT

A motor includes binding pins around which a coil lead wire is wound, and an end on one side in an axial direction of the binding pin and the coil lead wire are fixed to a surface facing one side in the axial direction of a substrate. An insulator assembly includes a substrate receiver contacting with the substrate from the other side in the axial direction. A heat sink is fixed to a cover, and an end on the other side in the axial direction of the heat sink presses down the integrated circuit mounted on the substrate toward the other side in the axial direction. The heat sink and the substrate receiver are disposed at positions where the heat sink and the substrate receiver overlap each other as viewed in the axial direction.

5 Claims, 8 Drawing Sheets

(51) Int. Cl.
*H02K 11/33* (2016.01)
*H02K 3/46* (2006.01)
*H02K 11/30* (2016.01)

(58) Field of Classification Search
CPC .......... H02K 3/522; H02K 9/227; H02K 5/22;
H02K 2211/03; H02K 11/30; H02K 9/22;
H02K 5/18; H02K 5/00; H02K 5/02;
H02K 5/06; H02K 5/08; H02K 5/15;
H02K 5/16; H02K 5/161; H02K 9/223;
H02K 5/1732; H02K 11/38
USPC ... 310/215, 214, 89, 68 R, 68 D, 51, 52, 53,
310/64
See application file for complete search history.

(56) References Cited

FOREIGN PATENT DOCUMENTS

| JP | 2008-011650 A | | 1/2008 |
|----|---------------|---|--------|
| JP | 2008011650 A | * | 1/2008 |
| JP | 2013211126 A | * | 10/2013 |

OTHER PUBLICATIONS

Maeyama Ken, Terminal Fitting and Motor with Terminal Fitting, Oct. 10, 2013, Fujitsu General LTD, JP 2013211126 (English Machine Translation) (Year: 2013).*

Official Communication issued in corresponding Chinese Patent Application No. 201880056758.3, dated Jul. 20, 2021.

* cited by examiner

MOTOR

CROSS REFERENCE TO RELATED APPLICATIONS

This is a U.S. national stage of PCT Application No. PCT/JP2018/034334, filed on Sep. 18, 2018, and priority under 35 U.S.C. § 119(a) and 35 U.S.C. § 365(b) is claimed from Japanese Application No. 2017-191857, filed Sep. 29, 2017, the entire disclosures of each of which are hereby incorporated herein by reference.

1. FIELD

The present disclosure relates to a motor.

2. BACKGROUND

A conventional motor has a terminal pin to which a winding end of a drive coil is entangled. The terminal pin protrudes from a terminal pin lead through portion of a power supply substrate. A terminal portion of the winding end is connected to a land of a power feed board by soldering.

When a substrate is accommodated in a cover of the motor, heat of an integrated circuit mounted on the substrate is transferred to the cover through a heat sink to cool the integrated circuit. However, during assembly of the motor, the board may be warped when the heat sink presses the substrate. There is room for improvement in preventing the warp of the substrate to ensure reliability of solder that fixes a binding pin and a coil lead wire to the substrate.

SUMMARY

According to one example embodiment of the present disclosure, a motor includes a rotor including a motor shaft extending along a center axis, a stator opposed to the rotor with a gap in a radial direction, a substrate located on one side in an axial direction of the stator, the substrate including a plate surface, on which an integrated circuit is mounted, disposed while facing one side in the axial direction, a heat sink disposed on one side in the axial direction of the substrate to contact thermally with the integrated circuit, and a cover accommodating the rotor, the stator, the substrate, and the heat sink. The stator includes a stator core, a coil mounted on the stator core, an insulator assembly radially opposed to the coil, and a plurality of binding pins extending from the insulator assembly toward one side in the axial direction to axially penetrate the substrate, the binding pins including a coil lead wire wound around, the coil lead wire extending from the coil, an end on one side in the axial direction of the binding pin and the coil lead wire are fixed to a surface facing one side in the axial direction of the substrate by solder, the insulator assembly includes a substrate receiver contacting with the substrate from another side in the axial direction, the heat sink is fixed to the cover, another end in the axial direction of the heat sink presses down the integrated circuit toward the other side in the axial direction, and the heat sink and the substrate receiver are disposed at positions where the heat sink and the substrate receiver overlap each other as viewed in the axial direction.

The above and other elements, features, steps, characteristics and advantages of the present disclosure will become more apparent from the following detailed description of the example embodiments with reference to the attached drawings.

DETAILED DESCRIPTION

Figure 1:
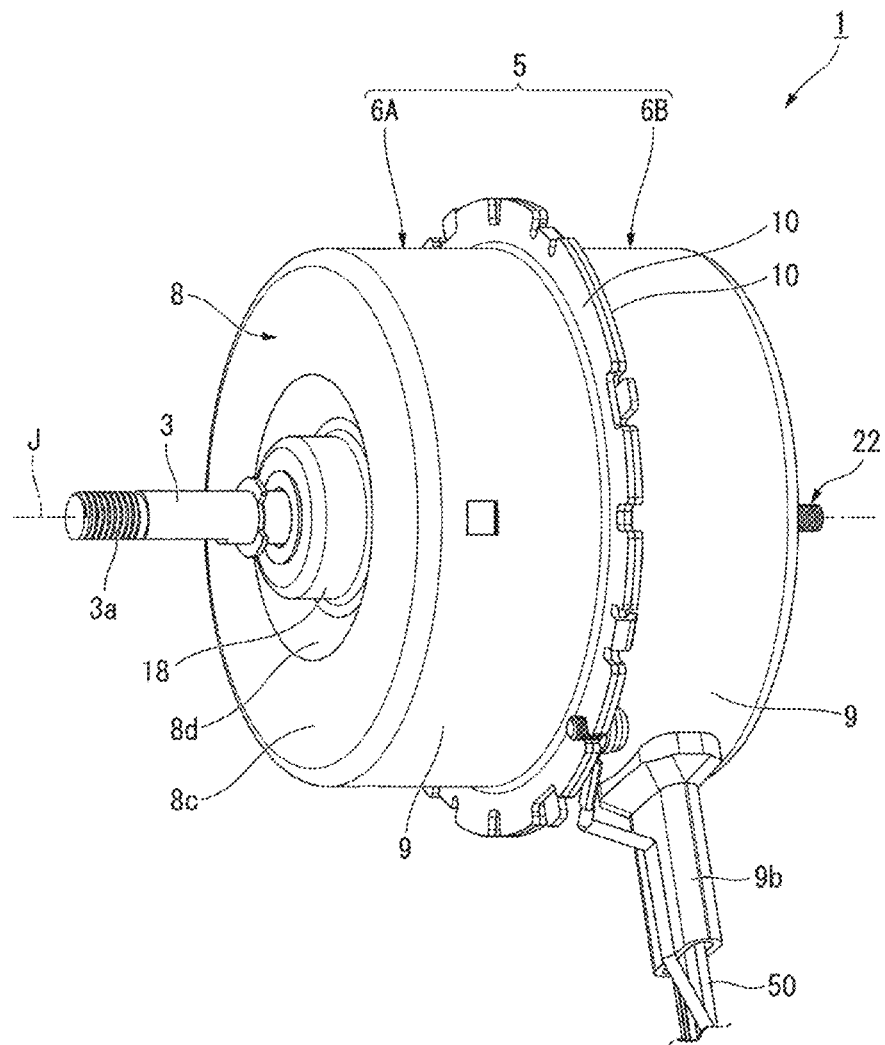
FIG. 1 is a perspective view illustrating a motor according to an example embodiment of the present disclosure.

As illustrated in FIGS. 1 to 5, a motor 1 according to an example embodiment includes a cover 5, a stud bolt 22, a wiring member 50, a rotor 2 including a motor shaft 3 extending along a center axis J, a stator 4, a pair of bearings 7, a substrate 20, a heat dissipation member 24, a heat sink 21, and a screw member 25. In both ends of the motor shaft 3, a first end at which an output end 3*a* is located is disposed outside the cover 5. A fan or the like (not illustrated) rotated by the motor 1 is connected to an output end 3*a*.

In the example embodiment, a direction parallel to the center axis J is simply referred to as an "axial direction". A direction from the first end at which the output end 3*a* is located toward a second end different from the first end in both ends of the motor shaft 3 is referred to as one side in the axial direction. One side in the axial direction is a left side in FIGS. 4 and 5. A direction from the second end of the motor shaft 3 toward the first end is referred to as the other side in the axial direction. The other side in the axial direction is a right side in FIGS. 4 and 5. A radial direction centered on the center axis J is simply referred to as a "radial direction". In the radial direction, a direction coming close to the center axis J is referred to as a radial inside, and a direction separating from the center axis J is referred to as a radial outside. A circumferential direction centered on the center axis J is simply referred to as a "circumferential direction".

Figure 4:
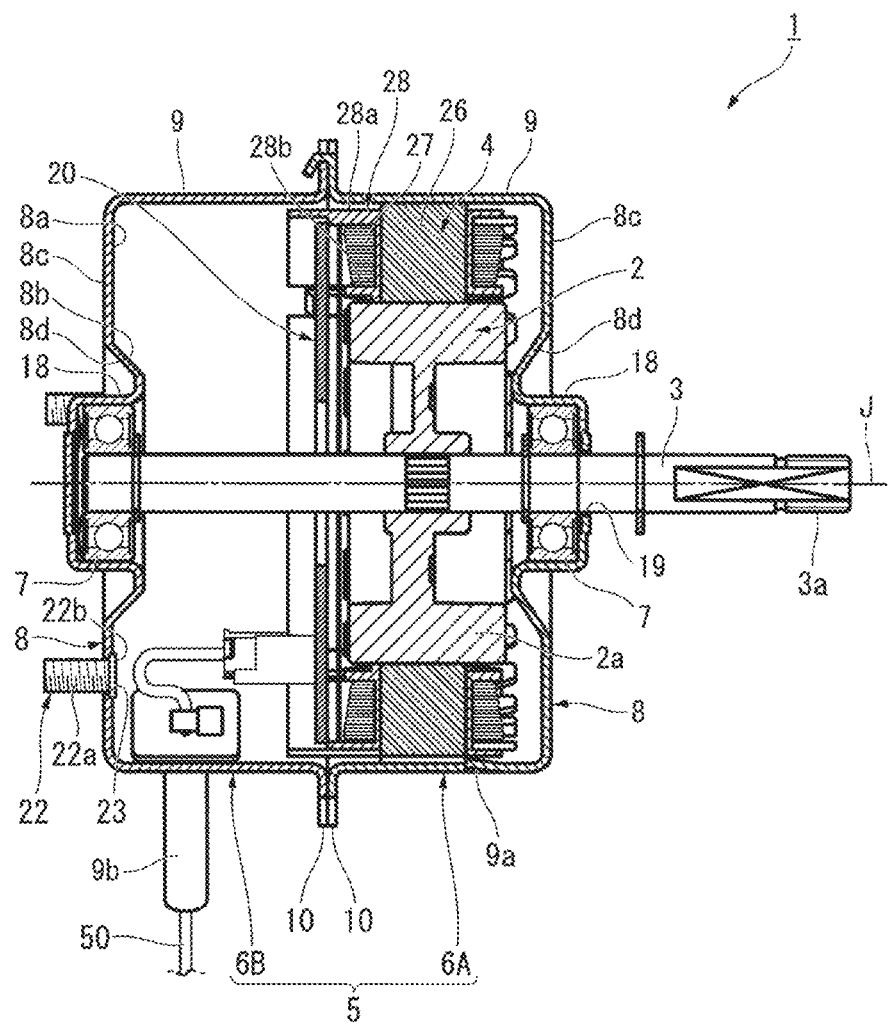
FIG. 4 is a sectional view taken along a line IV-IV in FIG. 3.
Figure 5:
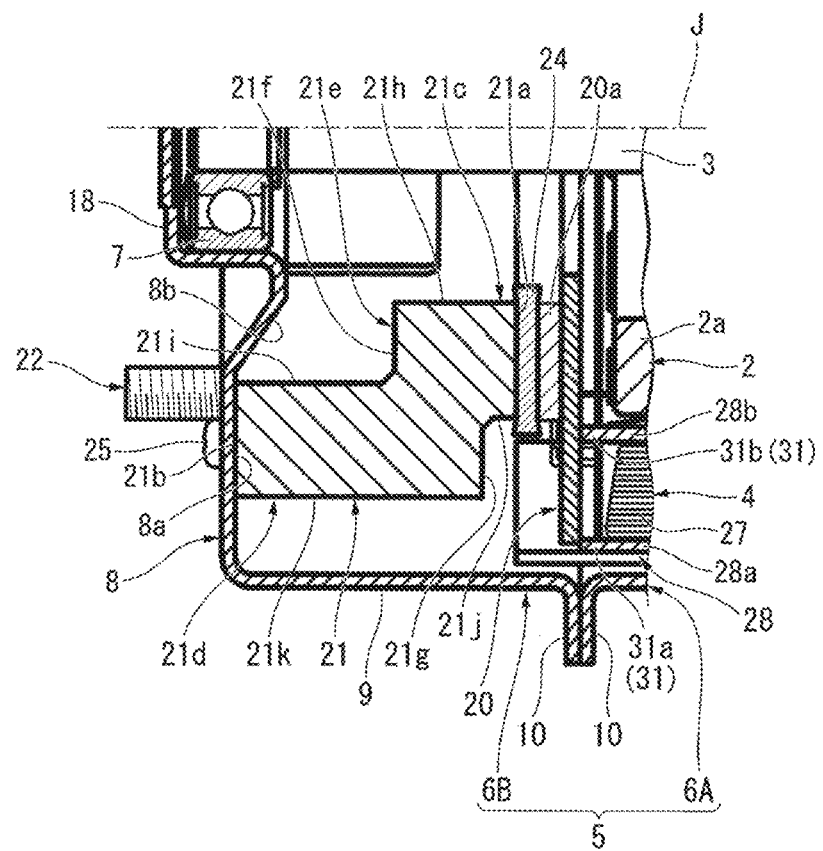
FIG. 5 is a sectional view taken along a line V-V in FIG. 3.

As illustrated in FIGS. 4 and 5, the cover 5 accommodates the rotor 2, the stator 4, the bearing 7, the substrate 20, and the heat sink 21. The cover 5 includes a first cup body 6A and a second cup body 6B. The cover 5 includes the first cup body 6A and the second cup body 6B that have a bottomed tubular shape. Each of the first cup body 6A and the second cup body 6B has the bottomed cylindrical shape centered on the center axis J. In the example of the example embodiment, a rotor magnet 2*a* (to be described later) of the rotor 2, the stator 4, and one of the pair of bearings 7 located on the other side in the axial direction are accommodated in the first cup body 6A. One of the pair of bearings 7 located on one side in the axial direction, the substrate 20, and the heat sink 21, and the heat dissipation member 24 are accommodated in the second cup body 6B.

As illustrated in FIG. 4, the cover 5 is made of a sheet metal. In the first cup body 6A and the second cup body 6B, at least the second cup body 6B is made of a sheet metal. In the example of the example embodiment, the first cup body 6A and the second cup body 6B are made of a sheet metal. For example, the first cup body 6A and the second cup body 6B are made of a steel plate. The first cup body 6A and the second cup body 6B are equal to each other in a radial dimension. The first cup body 6A and the second cup body 6B are press-molded into a cup shape using the same metal mold. That is, the first cup body 6A and the second cup body 6B are a press molded product. The cover 5 is a press cover.

The first cup body 6A is located on the other side in the axial direction with respect to the second cup body 6B. The second cup body 6B is located on one side in the axial direction with respect to the first cup body 6A. The first cup body 6A is open onto one side in the axial direction. The second cup body 6B is open onto the other side in the axial direction. Each of the first cup body 6A and the second cup body 6B includes a bottom wall 8, a circumferential wall 9, and a flange 10. The first cup body 6A and the second cup body 6B are disposed while openings of the circumferential walls 9 of the first cup body 6A and the second cup body 6B are opposed to each other. The first cup body 6A and the second cup body 6B are fixed to each other while openings of the first cup body 6A and the second cup body 6B are opposed to each other in the axial direction. The flange 10 of the first cup body 6A and the flange 10 of the second cup body 6B are opposed to each other in the axial direction, and are in contact with each other. The flanges 10 of the first cup body 6A and the second cup body 6B are fixed to each other. An inside of the first cup body 6A and an inside of the second cup body 6B communicate with each other while the first cup body 6A and the second cup body 6B are fixed to each other.

The bottom wall 8 includes a bearing holder 18, a flat unit 8c, and a connection unit 8d. The bearing holder 18 has a bottomed tubular shape. The bearing holder 18 has the bottomed cylindrical shape centered on the center axis J. The bearing holder 18 is open toward the inside of the cover 5. The bearing holder 18 holds the bearing 7. For example, the bearing 7 is a ball bearing. The bearing 7 is fitted in and fixed to the bearing holder 18. In the cover 5, the pair of bearings 7 is disposed away from each other in the axial direction. The pair of bearings 7 is disposed at both the ends in the axial direction of the cover 5. The pair of bearings 7 rotatably supports the motor shaft 3. The bearing 7 rotatably supports the motor shaft 3 about the center axis J.

A shaft insertion hole 19 axially penetrating the bottom wall 8 is made in the bottom wall 8 of the first cup body 6A. The shaft insertion hole 19 is made in the bearing holder 18 of the first cup body 6A. The shaft insertion hole 19 is a through-hole penetrating a bottom of the bearing holder 18. The motor shaft 3 is inserted into the shaft insertion hole 19. The motor shaft 3 protrudes outward from the inside of the cover 5 through the shaft insertion hole 19.

The flat unit 8c has an annular shape extending in the circumferential direction. The flat unit 8c has an annular plate shape centered on the center axis J. A plate surface of the flat unit 8c is oriented toward the axial direction, and spreads in a direction orthogonal to the center axis J. A radial position of the flat unit 8c is disposed outside a radial position of the bearing holder 18. The flat unit 8c surrounds the bearing holder 18 from the radial outside. The flat unit 8c is disposed at a position overlapping the bearing holder 18 as viewed in the radial direction. The flat unit 8c is connected to the circumferential wall 9. An outer edge of the flat unit 8c is connected to the end of the circumferential wall 9 on an opposite side to the opening along the axial direction.

A through-hole 23 is made in the bottom wall 8 of the second cup body 6B. The second cup body 6B includes a plurality of through-holes 23 axially penetrating the bottom wall 8. For example, the through hole 23 is a circular hole. The through-hole 23 is made in the flat unit 8c of the second cup body 6B. The through-hole 23 axially penetrates the flat unit 8c of the second cup body 6B. The plurality of through-holes 23 are circumferentially made at intervals in the bottom wall 8. The plurality of through-holes 23 are circumferentially made at equal intervals in the flat unit 8c.

A plurality of stud bolts 22 are provided in the bottom wall 8 of the second cup body 6B. The stud bolt 22 protrudes from the bottom wall 8 of the second cup body 6B onto one side in the axial direction. The plurality of stud bolts 22 are circumferentially disposed at intervals in the bottom wall 8. In the example embodiment, at least three stud bolts 22 are provided at intervals in the circumferential direction in the bottom wall 8 of the second cup body 6B. In the illustrated example, four stud bolts 22 are circumferentially provided at equal intervals in the bottom wall 8. The plurality of stud bolts 22 are disposed at intervals in the circumferential direction in the flat unit 8c. The stud bolt 22 is inserted into the through-hole 23, and attached to the bottom wall 8. The stud bolt 22 is press-fitted in the through-hole 23, and fixed to the flat unit 8c. Using the stud bolt 22, the motor 1 is attached and fixed to a device frame (not illustrated) to which the motor 1 is attached.

The stud bolt 22 has a bolt 22a and a head 22b. The bolt 22a has a columnar shape extending in the axial direction. The bolt 22a has a columnar shape. The bolt 22a is inserted into the through-hole 23. The bolt 22a protrudes onto one side in the axial direction through the through-hole 23. The bolt 22a protrudes from the bottom wall 8 onto one side in the axial direction. In the bolt 22a, the end on the other side in the axial direction is fitted in the through-hole 23. In the bolt 22a, a screw unit is provided in a portion except for at least the end on the other side in the axial direction. In the example of FIG. 4, the screw unit is provided over an entire axial length of the bolt 22a. The screw unit includes a male screw on the outer circumference. The screw unit is exposed to the outside of the cover 5.

The head 22b has a plate shape. The head 22b has a disc shape coaxial with the bolt 22a. The head 22b has an outer diameter larger than that of the bolt 22a. The head 22b is connected to the end on the other axial side of the bolt 22a. The head 22b contacts with the bottom wall 8 from the other side in the axial direction. The head 22b contacts with the bottom wall 8 from the inside of the motor. The head 22b contacts with a flat surface 8a (to be described later) of the flat unit 8c from the other side in the axial direction. For example, the dimension of the head 22b protruding from the flat unit 8c onto the other side in the axial direction is less than or equal to 1 mm. In the example of the example embodiment, the dimension of the head 22b protruding from the flat unit 8c onto the other side in the axial direction ranges from 0.3 mm to 0.4 mm.

A screw attachment hole (not illustrated) is made in the bottom wall 8 of the second cup body 6B. The second cup body 6B includes the screw attachment hole axially penetrating the bottom wall 8. For example, the screw attachment hole is a circular hole. A plurality of screw attachment holes are made in the flat unit 8c of the second cup body 6B. The screw attachment hole axially penetrates the flat unit 8c of the second cup body 6B. The plurality of screw attachment holes are circumferentially made away from each other in the bottom wall 8. The two screw attachment holes are made. A screw member 25 (to be described later) is inserted into the screw attachment hole.

The connection unit 8d connects the bearing holder 18 and the flat unit 8c. The connection unit 8d connects an opening of a tubular portion of the bearing holder 18 and an inner circumferential edge of the flat unit 8c. The connection unit 8d is disposed between the bearing holder 18 and the flat unit 8c. The connection unit 8d is located between the bearing holder 18 and the flat unit 8c along the radial direction. In the example of the example embodiment, the connection unit 8d has a tapered tubular shape centered on the center axis J. The connection unit 8d extends toward an opening side of the circumferential wall 9 along the axial direction as going from the flat unit 8c toward the radial inside. That is, the connection unit 8d of the first cup body 6A extends toward one side in the axial direction as going from the flat unit 8c toward the radial inside. The connection unit 8d of the second cup body 6B extends toward the other side in the axial direction as going from the flat unit 8c toward the radial inside.

The surface facing the other side in the axial direction of the bottom wall 8 of the second cup body 6B includes the flat surface 8a and a connection surface 8b. The flat surface 8a is disposed on the flat unit 8c of the second cup body 6B. The flat surface 8a is a surface facing the other side in the axial direction of the flat unit 8c of the second cup body 6B. The flat surface 8a has an annular shape perpendicular to the center axis J. The flat surface 8a has an annular surface shape spreading in a direction orthogonal to the center axis J. The flat surface 8a is disposed at a radial position outside a radial position of the bearing holder 18. The flat surface 8a surrounds the bearing holder 18 from the radial outside.

The connection surface 8b is disposed in the connection unit 8d of the second cup body 6B. The connection surface 8b is a surface facing the other side in the axial direction of the connection unit 8d of the second cup body 6B. The connection surface 8b connects the bearing holder 18 and the flat surface 8a. The connection surface 8b connects the opening of the tubular portion of the bearing holder 18 and the inner circumferential edge of the flat unit 8a. The connection surface 8b is disposed between the bearing holder 18 and the flat surface 8a. The connection surface 8b is located between the bearing holder 18 and the flat surface 8a along the radial direction. In the example of the example embodiment, the connection surface 8b has a tapered tubular shape centered on the center axis J. The connection surface 8b extends toward one side in the axial direction as going from the bearing holder 18 toward the radial outside.

The circumferential wall 9 has a tubular shape centered on the center axis J. The circumferential wall 9 has a cylindrical shape. The circumferential wall 9 extends axially from the outer circumferential edge of the bottom wall 8. The circumferential wall 9 is open onto the opposite side to the bottom wall 8 along the axial direction. The opening is located at the end of the circumferential wall 9 on the opposite side to the bottom wall 8 along the axial direction. The end of the circumferential wall 9 on the opposite side to the opening along the axial direction is closed by the bottom wall 8.

A plurality of stator support claws 9a are provided in the circumferential wall 9 of the first cup body 6A. The stator support claw 9a protrudes from the circumferential wall 9 toward the inside of the first cup body 6A. The plurality of stator support claws 9a are circumferentially disposed at equal intervals in the circumferential wall 9. The stator support claw 9a contacts with the stator 4 disposed in the first cup body 6A from the other side in the axial direction. The stator support claw 9a supports the stator 4 toward one side in the axial direction.

The circumferential wall 9 of the second cup body 6B includes a bush 9b. The bush 9b has a cylindrical shape. The bush 9b is elastically deformable. A wiring through-hole (not illustrated) that penetrates the circumferential wall 9 in the radial direction is made in the circumferential wall 9 of the second cup body 6B. The bush 9b is inserted into the wiring through-hole, and fixed to the circumferential wall 9. The outside and inside of the cover 5 communicate with each other through the inside of the bush 9b. A wiring member 50 is passed through the bush 9b. The wiring member 50 extends over the outside and inside of the cover 5 through the bush 9b. A wiring outlet (not illustrated) is provided at the end of the radial inside of the bush 9b. That is, the circumferential wall 9 of the second cup body 6B includes the wiring outlet. The wiring outlet is a hole that is open to the cover 5. The wiring member 50 protrudes into the cover 5 from the wiring outlet through the bush 9b. The wiring member 50 is electrically connected to the substrate 20.

The flange 10 has an annular shape extending radially outward from an end edge of the circumferential wall 9 on the opposite side to the bottom wall 8. The flange 10 has an annular plate shape spreading radially outward from the end of the circumferential wall 9 on the opposite side to the bottom wall 8 along the axial direction. A plate surface of the flange 10 faces the axial direction, and spreads in the direction orthogonal to the center axis J. The plate surface of the first cup body 6A facing one side in the axial direction of the flange 10 contacts with the plate surface of the second cup body 6B facing the other side in the axial direction of the flange 10. The first cup body 6A and the second cup body 6B are disposed while the flanges 10 of the first cup body 6A and the second cup body 6B contact with each other in the axial direction.

The rotor 2 includes the motor shaft 3 and the rotor magnet 2a. In the motor shaft 3, a portion supported by the pair of bearings 7 and a portion located between the pair of bearings 7 are disposed in the cover 5. In the motor shaft 3, a portion located closer to the other side in the axial direction than the bearing 7 accommodated in the first cup body 6A is disposed outside the cover 5. The motor shaft 3 and the pair of bearings 7 are prevented from moving in the axial direction using a snap ring or the like. The rotor magnet 2a has a tubular shape centered on the center axis J. The rotor magnet 2a has a cylindrical shape. The rotor magnet 2a is fixed to the outer circumferential surface of the motor shaft 3.

The stator 4 is fitted in the cover 5. The stator 4 is fitted in and fixed to the inner circumferential surface of the circumferential wall 9 of the first cup body 6A. The stator 4 is radially opposed to the rotor 2 with a gap interposed therebetween. The stator 4 is opposed to the rotor 2 from the radial outside. The stator 4 includes a stator core 26, a coil 27, an insulating unit 28, and a binding pin 29. The stator core 26 has an annular shape surrounding the radial outside of the rotor 2. The stator core 26 is radially opposed to the rotor magnet 2a with a gap interposed therebetween. The stator core 26 is opposed to the rotor magnet 2a from the radial outside.

The coil 27 is mounted on the stator core 26. The coil 27 is indirectly mounted on the stator core 26 with the insulating unit 28 interposed therebetween. The insulating unit 28 includes a portion disposed between the stator core 26 and the coil 27. The insulating unit 28 includes a portion radially opposed to the coil 27. That is, the insulating unit 28 is radially opposed to the coil 27. The insulating unit 28 includes an outer circumferential-side insulating unit 28a located on the radial outside of the coil 27 and an inner circumferential-side insulating unit 28b located on the radial inside of the coil 27. The outer circumferential-side insulating unit 28a is opposed to the coil 27 from the radial outside. The inner circumferential-side insulating unit 28b is opposed to the coil 27 from the radial inside. The substrate 20 is attached and fixed to the outer circumferential-side insulating unit 28a.

Figure 8:
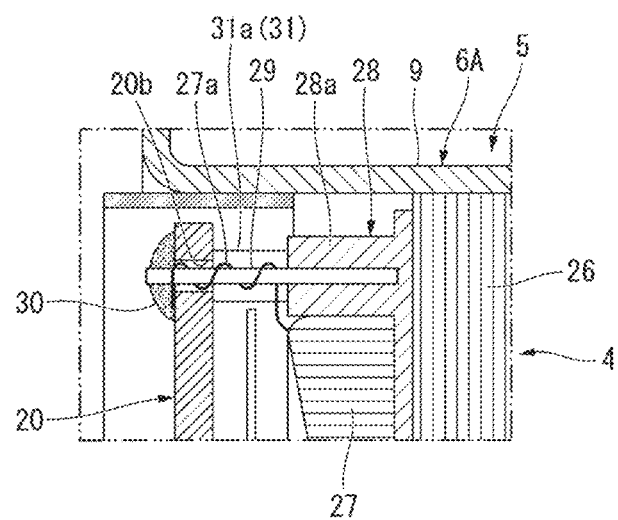
FIG. 8 is an enlarged sectional view illustrating a connection portion between a coil lead wire and the substrate.

As illustrated in FIGS. 5 and 8, the insulating unit 28 includes a substrate receiving unit 31 that comes into contact with the substrate 20 from the other side in the axial direction. The substrate receiving unit 31 includes an outer circumferential-side substrate receiving unit 31a and an inner circumferential-side substrate receiving unit 31b. The outer circumferential-side substrate receiving unit 31a contacts with an outer circumference of the surface on the other side in the axial direction of the substrate 20. The outer circumferential-side substrate receiving unit 31a contacts with the substrate 20 from the other side in the axial direction on the radial outside of the coil 27. The outer circumferential-side substrate receiving unit 31a is provided in the outer circumferential-side insulating unit 28a. A plurality of outer circumferential-side substrate receiving units 31a are circumferentially provided at intervals in the outer circumferential-side insulating unit 28a. That is, the insulating unit 28 includes the plurality of outer circumferential-side substrate receiving units 31a.

As illustrated in FIG. 5, the inner circumferential-side substrate receiving unit 31b contacts with the surface on the other side in the axial direction of the substrate 20 on the inner circumferential side of the coil 27. The inner circumferential-side substrate receiving unit 31b contacts with the substrate 20 from the other side in the axial direction on the radial inside of the coil 27. The inner circumferential-side substrate receiving unit 31b is provided in the inner circumferential-side insulating unit 28b. The plurality of inner circumferential-side substrate receiving units 31b are circumferentially provided at intervals in the inner circumferential-side insulating unit 28b. That is, the insulating unit 28 includes the plurality of inner circumferential-side substrate receiving units 31b.

Figure 7:
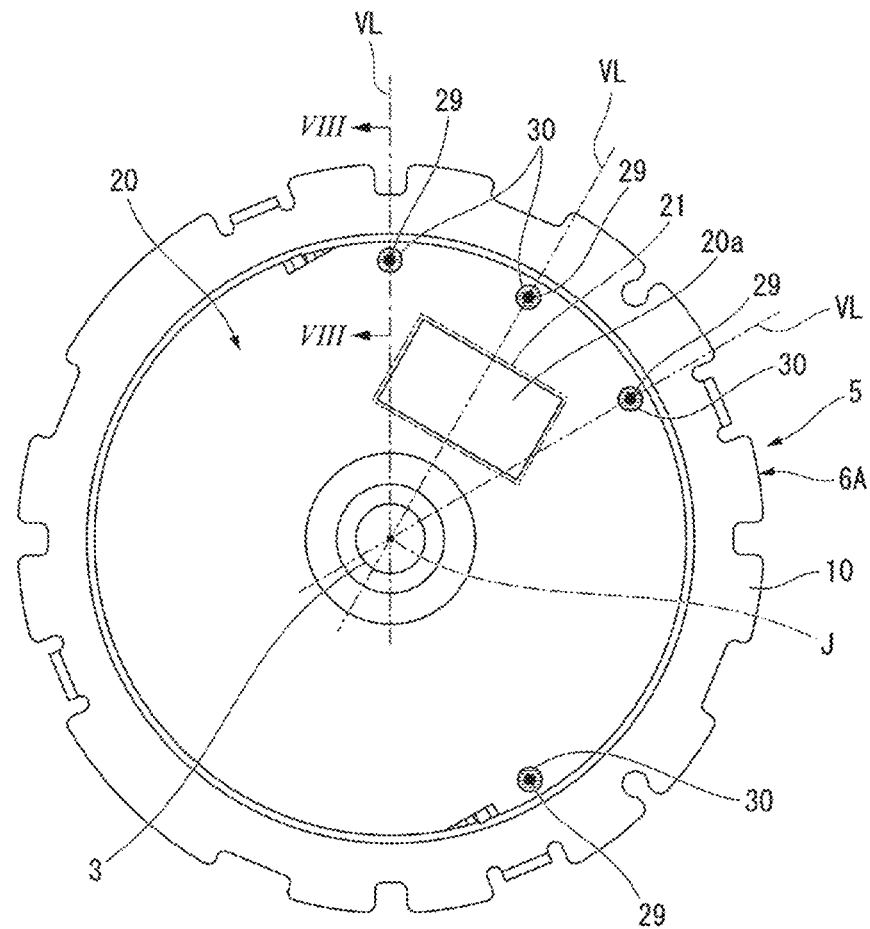
FIG. 7 is a plan view illustrating an inside of the motor from which a second cup body is removed as viewed in the axial direction, and is a front view illustrating a plate surface facing one side in the axial direction of a substrate.

As illustrated in FIGS. 7 and 8, the binding pin 29 extends from the insulating unit 28 to one side in the axial direction, and penetrates the substrate 20 in the axial direction. The binding pin 29 is provided in the outer circumferential-side insulating unit 28a. A plurality of binding pins 29 are circumferentially provided at intervals in the outer circumferential-side insulating unit 28a. The binding pin 29 is disposed between the outer circumferential-side substrate receiving units 31a adjacent to each other in the circumferential direction. A coil lead wire 27a extending from the coil 27 is wound around the binding pin 29. The number of coil lead wires 27a is four. The four coil lead wires 27a are used for a U-phase, a V-phase, a W-phase, and a neutral point. The number of binding pins 29 is four. The number of binding pins 29 is the same as the number of coil lead wires 27a. That is, four sets of the coil lead wire 27a and the binding pin 29 are provided.

As illustrated in FIGS. 4 and 5, the substrate 20 is located on one side in the axial direction of the stator 4. The substrate 20 has a disc shape. The substrate 20 has an annular plate shape centered on the center axis J. The plate surface of the substrate 20 faces the axial direction, and spreads in the direction orthogonal to the center axis J. The motor shaft 3 extends in the axial direction on the radial inside of the substrate 20. As illustrated in FIG. 8, a pin insertion hole 20b axially penetrating the substrate 20 is provided in the substrate 20. The pin insertion hole 20b is disposed on the outer circumferential edge of the substrate 20. The plurality of pin insertion holes 20b are circumferentially provided at intervals at the outer circumferential edge of the substrate 20. The number of pin insertion holes 20b is the same as the number of binding pins 29. The binding pin 29 and the coil lead wire 27a are passed through the pin insertion hole 20b. The binding pin 29 and the coil lead wire 27a are inserted into the pin insertion hole 20b, and protrude from the plate surface of the substrate 20 facing one side in the axial direction. The end of the binding pin 29 on one side in the axial direction and the coil lead wire 27a are fixed by solder 30 to the surface of the substrate 20 facing one side in the axial direction. As illustrated in FIG. 7, the solder 30 is disposed at the outer circumferential edge of the plate surface facing one side in the axial direction of the substrate 20.

The substrate 20 is electrically connected to the stator 4. The substrate 20 is electrically connected to the coil lead wire 27a of the coil 27. The substrate 20 is connected to the coil lead wire 27a at the outer circumferential edge of the plate surface facing one side in the axial direction of the substrate 20. That is, the connection portion between the substrate 20 and the coil lead wire 27a is located at the outer circumferential edge of the substrate 20. As illustrated in FIGS. 4 and 5, the substrate 20 is located on one side in the axial direction of the rotor magnet 2a. The substrate 20 is disposed at a position overlapping the stator 4 and the rotor magnet 2a as viewed from the axial direction. The substrate 20 is surrounded from the radial outside by the outer circumferential-side insulating unit 28a. The substrate 20 is disposed at a position overlapping the outer circumferential-side insulating unit 28a as viewed from the radial direction. In the example of the example embodiment, the substrate 20 is disposed at a position overlapping the flange 10 of the second cup body 6B as viewed in the radial direction.

As illustrated in FIG. 5, an integrated circuit 20a and a capacitor (not illustrated) are mounted on the plate surface of the substrate 20. The substrate 20 is disposed while the plate surface on which the integrated circuit 20a is mounted faces one side in the axial direction. As illustrated in FIG. 7, the integrated circuit 20a has a quadrangular plate shape. The integrated circuit 20a has a rectangular plate shape having a circumferential length larger than a radial length. The plate surface of the integrated circuit 20a faces the axial direction. The plate surface of the integrated circuit 20a has a rectangular shape having the circumferential length larger than the radial length. The integrated circuit 20a is disposed while separated from the outer circumferential edge of the substrate 20 to the radial inside. The integrated circuit 20a is disposed while separated on the radial inside with respect to a connection portion (that is, the solder 30) between the substrate 20 and the coil lead wire 27a.

As illustrated in FIG. 7, the binding pin 29, the coil lead wire 27a (not illustrated), and the solder 30 are disposed between the outer circumferential edge of the substrate 20 along the radial direction and the integrated circuit 20a. As illustrated in FIG. 7, when viewed in the axial direction, the heat sink 21 is located on a virtual straight line VL passing through at least one binding pin 29 and the center axis J, and is located between the binding pin 29 and the center axis J on this virtual straight line VL. That is, the virtual straight line VL and the heat sink 21 intersect with each other as viewed in the axial direction. The heat sink 21 is disposed between the binding pin 29 and the center axis J along the radial direction. At least one binding pin 29 and the heat sink 21 are arranged in the radial direction. At least one binding pin 29 and the heat sink 21 face each other in the radial direction.

In the example embodiment, when viewed in the axial direction, the heat sink 21 is located on a plurality of virtual straight lines VL extending from the plurality of binding pins 29 to the center axis J, and is located between the binding pin 29 and the center axis J on each virtual straight line VL. In the example of FIG. 7, the heat sink 21 is located on three virtual straight lines VL extending from the three binding pins 29 to the center axis J as viewed in the axial direction. As described later, because the heat sink 21 presses down the integrated circuit 20a toward the other side in the axial direction, the integrated circuit 20a is also located on the virtual straight line VL.

The capacitor is mounted on the plate surface of the substrate 20 facing one side in the axial direction. The capacitor has a columnar shape. The capacitor extends in the axial direction. The surface facing one side in the axial direction of the capacitor is axially opposed to the bottom wall 8 of the second cup body 6B. A surface facing one side in the axial direction of the capacitor is disposed with a gap interposed between the surface facing one side in the axial direction of the capacitor and a surface facing the other side in the axial direction of the bottom wall 8.

As illustrated in FIG. 5, the heat dissipation member 24 is sandwiched between the heat sink 21 (to be described later) and the integrated circuit 20a. The heat dissipation member 24 is elastically deformable. The heat dissipation member 24 has a plate shape. The heat dissipation member 24 has a quadrangular plate shape. The heat dissipation member 24 has a rectangular plate shape having the circumferential length larger than the radial length. The plate surface of the heat dissipation member 24 faces the axial direction, and spreads in the direction orthogonal to the center axis J. The plate surface of the heat dissipation member 24 has a rectangular shape having the circumferential length larger than the radial length.

The plate surface of the heat dissipation member 24 facing the other side in the axial direction contacts with the integrated circuit 20a. The plate surface of the heat dissipation member 24 facing the other side in the axial direction contacts with the plate surface of the integrated circuit 20a facing the one side in the axial direction. A surface area of the plate surface facing the other side in the axial direction of the heat dissipation member 24 is larger than a surface area of the plate surface facing one side in the axial direction of the integrated circuit 20a. The plate surface facing the other side in the axial direction of the heat dissipation member 24 covers the plate surface facing one side in the axial direction of the integrated circuit 20a. The plate surface facing one side in the axial direction of the heat dissipation member 24 contacts with the heat sink 21. The plate surface facing one side in the axial direction of the heat dissipation member 24 contacts with the end face 21a facing the other side in the axial direction of the heat sink 21. The surface area of the plate surface facing one side in the axial direction of the heat dissipation member 24 is larger than the surface area of the end face 21a. The plate surface facing one side in the axial direction of the heat dissipation member 24 covers with the end face 21a.

The heat sink 21 is disposed on one side in the axial direction of the substrate 20. The heat sink 21 contacts thermally with the integrated circuit 20a. The heat sink 21 contacts thermally with the integrated circuit 20a with the heat dissipation member 24 interposed therebetween. The heat sink 21 is fixed to the cover 5. The heat sink 21 is attached and fixed to the second cup body 6B. The heat sink 21 is fixed to the bottom wall 8 of the second cup body 6B.

Figure 6:
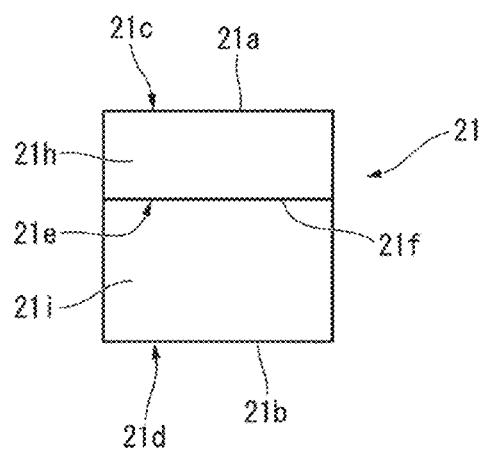
FIG. 6 is a front view illustrating a heat sink as viewed from an inside in a radial direction.

As illustrated in FIGS. 5 and 6, the heat sink 21 includes a first end 21c, a second end 21d, and a bent unit 21e. The first end 21c is an end on the other side in the axial direction of the heat sink 21. The first end 21c contacts thermally with the integrated circuit 20a. The first end 21c presses down the integrated circuit 20a toward the other side in the axial direction. The first end 21c has a rectangular parallelepiped shape. In the first end 21c, the circumferential length is longer than the radial length.

The first end 21c includes an end face 21a facing the other side in the axial direction, a surface 21h facing the radial inside, and a surface 21j facing the radial outside. That is, the heat sink 21 includes the end face 21a facing the other side in the axial direction. The end face 21a has a quadrangular shape. The end face 21a has a rectangular shape. In the end face 21a, the circumferential length is longer than the radial length. The end face 21a contacts with the heat dissipation member 24 from one side in the axial direction. The surface area of the end face 21a is substantially equal to the surface area of the plate surface facing one side in the axial direction of the integrated circuit 20a. The end face 21a is disposed at a position overlapping the heat dissipation member 24 and the integrated circuit 20a as viewed in the axial direction. The circumferential edge portion of the end face 21a is disposed at a position substantially overlapping the circumferential edge portion of the integrated circuit 20a as viewed in the axial direction.

The surface 21h has a quadrangular shape. The surface 21h has a rectangular shape. In the surface 21h, the circumferential length is longer than the axial length. The surface 21j has a quadrangular shape. The surface 21j is rectangular shape. In the surface 21j, the circumferential length is longer than the axial length.

The second end 21d is an end on one side in the axial direction of the heat sink 21. The second end 21d has a rectangular parallelepiped shape. In the second end 21d, the circumferential length is longer than the radial length. The second end 21d contacts with the bottom wall 8 of the second cup body 6B. The second end 21d contacts with the flat unit 8c of the bottom wall 8 from the other side in the axial direction. The second end 21d contacts with the flat surface 8a.

The second end 21d is disposed at a radial position outside a radial position of the first end 21c. That is, the radial center position of the second end 21d is disposed on the radial outside of the radial center position of the first end 21c. The radially inner end of the second end 21d is located on the radial outside of the radially inner end of the first end 21c. The radially outer end of the second end 21d is located on the radial outside of the radially outer end of the first end 21c.

The second end 21d includes an end face 21b facing one side in the axial direction, a surface 21i facing the radial inside, and a surface 21k facing the radial outside. That is, the heat sink 21 includes the end face 21b facing one side in the axial direction. The end face 21b has a quadrangular shape. The end face 21b has a rectangular shape. In the end face 21b, the circumferential length is longer than the radial length. The surface area of the end face 21b is equal to or larger than the surface area of the end face 21a. That is, the surface area of the end face 21b is greater than or equal to the surface area of the end face 21a.

Figure 3:
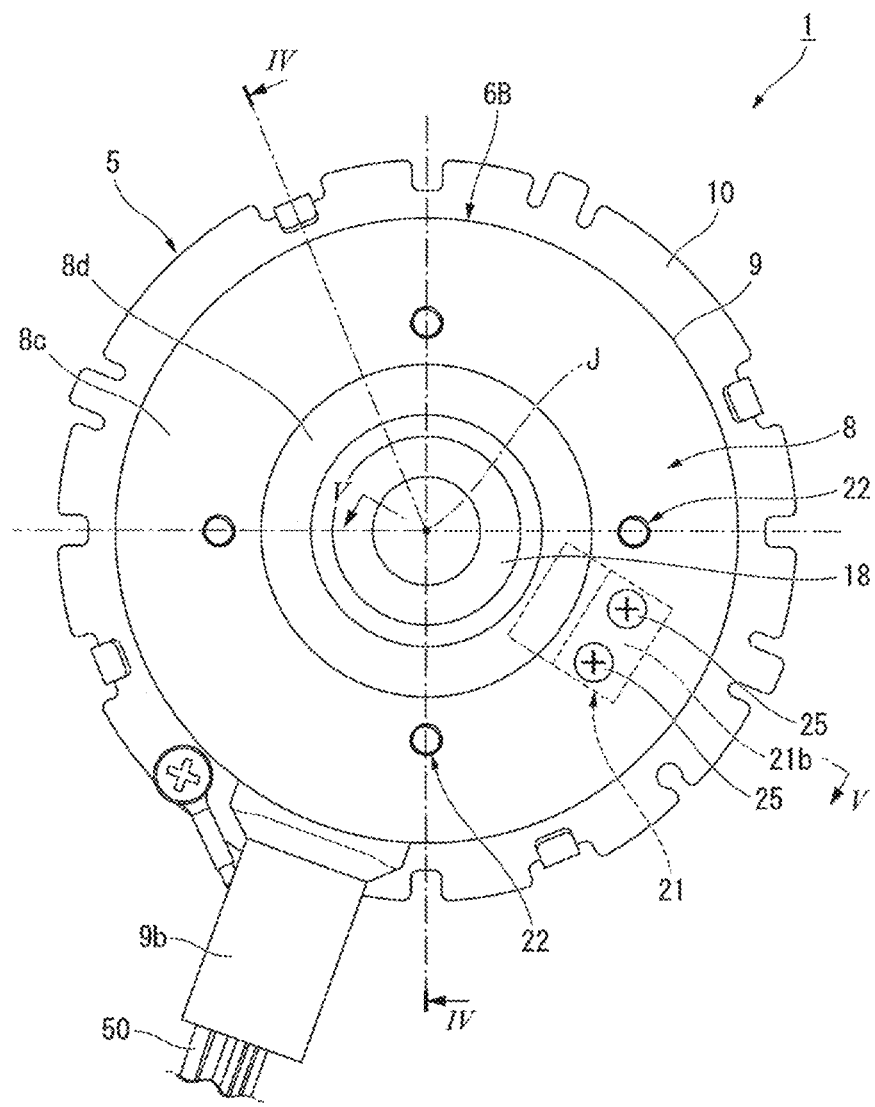
FIG. 3 is a plan view illustrating a motor according to an example embodiment of the present disclosure as viewed from the other side in an axial direction.

The end face 21b contacts with the bottom wall 8 of the second cup body 6B from the other side in the axial direction. As illustrated in FIG. 3, the end face 21b contacts with a portion located between the stud bolts 22 adjacent to each other in the circumferential direction in the surface on the other side in the axial direction of the bottom wall 8 of the second cup body 6B. The end face 21b contacts with a portion located between the heads 22b adjacent to each other in the circumferential direction in the surface on the other surface in the axial direction of the bottom wall 8 of the second cup body 6B (see FIGS. 4 and 5). As illustrated in FIG. 5, the end face 21b contacts with the flat surface 8a of the flat unit 8c. That is, the second end 21d contacts the flat surface 8a. The second end 21d is disposed at a position overlapping the flat surface 8a as viewed in the axial direction.

Although not illustrated, a screw hole is made in the end face 21b. That is, the second end 21d includes the screw hole. The screw hole is open to the end face 21b, and extends in the axial direction. The screw hole includes a female screw on the inner circumference. A plurality of screw holes are provided at the second end 21d. The plurality of screw holes are circumferentially disposed away from each other in the second end 21d. The number of screw holes is two. A screw member 25 (to be described later) is inserted into and fixed to the screw hole.

As illustrated in FIGS. 5 and 6, the surface 21i has a quadrangular shape. The surface 21i has a rectangular shape. In the surface 21i, the circumferential length is longer than the axial length. The radial position of the surface 21i is disposed on the outside of the radial position of the surface 21h. The surface 21k has a quadrangular shape. The surface 21k has a rectangular shape. In the surface 21k, the circumferential length is longer than the axial length. The radial position of the surface 21k is disposed on the outside of the radial position of the surface 21j.

The bent unit 21e is a portion located between both the ends 21c and 21d in the axial direction of the heat sink 21. The bent unit 21e is an intermediate portion located between both the ends 21c and 21d in the axial direction of the heat sink 21. That is, the bent unit 21e is disposed at the intermediate position between the first end 21c and the second end 21d in the axial direction. The bent unit 21e connects the first end 21c and the second end 21d.

The bent unit 21e includes a first step surface 21f and a second step surface 21g. That is, the heat sink 21 includes the first step surface 21f and the second step surface 21g. The first step surface 21f connects the surface 21h and the surface 21i. The first step surface 21f faces one side in the axial direction. The first step surface 21f has a quadrangular shape. The first step surface 21f has a rectangular shape. In the first step surface 21f, the circumferential length is longer than the radial length. The second step surface 21g connects the surface 21j and the surface 21k. The second step surface 21g faces the other side in the axial direction. The second step surface 21g has a quadrangular shape. The second step surface 21g has a rectangular shape. In the second step surface 21g, the circumferential length is longer than the radial length. The axial position of the second step surface 21g is disposed closer to the other side in the axial direction than the axial position of the first step surface 21f.

In the example of the example embodiment, the circumferential length of the heat sink 21 is substantially kept constant over the entire length in the axial direction. Each of the pair of side faces facing the circumferential direction of the heat sink 21 has a planar shape parallel to the center axis J. The pair of side faces is parallel to each other. The side face is flush with the first end 21c, the bent unit 21e, and the second end 21d.

At the bent unit 21e, the radial length of the heat sink 21 is longer than that of the first end 21c and the second end 21d. The radial length of the heat sink 21 becomes the maximum at the bent unit 21e. The radial length of the second end 21d is equal to or longer than the radial length of the first end 21c. That is, the radial length of the second end 21d is greater than or equal to the radial length of the first end 21c.

As illustrated in FIG. 5, the heat sink 21 and the substrate receiving unit 31 are disposed at positions where the heat sink 21 and the substrate receiving unit 31 overlap each other as viewed in the axial direction. The heat sink 21 and the substrate receiving unit 31 are opposed to each other in the axial direction. The heat dissipation member 24, the integrated circuit 20a, and the substrate 20 are sandwiched between the heat sink 21 and the substrate receiving unit 31. That is, the substrate 20 is sandwiched between the heat sink 21 and the substrate receiving unit 31. The substrate 20 is supported from both the sides in the axial direction by the heat sink 21 and the substrate receiving unit 31. In the example embodiment, the heat sink 21 and the inner circumferential-side substrate receiving unit 31b are disposed at positions where the heat sink 21 and the inner circumferential-side substrate receiving unit 31b overlap each other as viewed in the axial direction. In the illustrated example, the inner circumferential-side substrate receiving unit 31b, the bent unit 21e, and the second end 21d are disposed at positions where the inner circumferential-side substrate receiving unit 31b, the bent unit 21e, and the second end 21d overlap one another as viewed in the axial direction.

Figure 2:
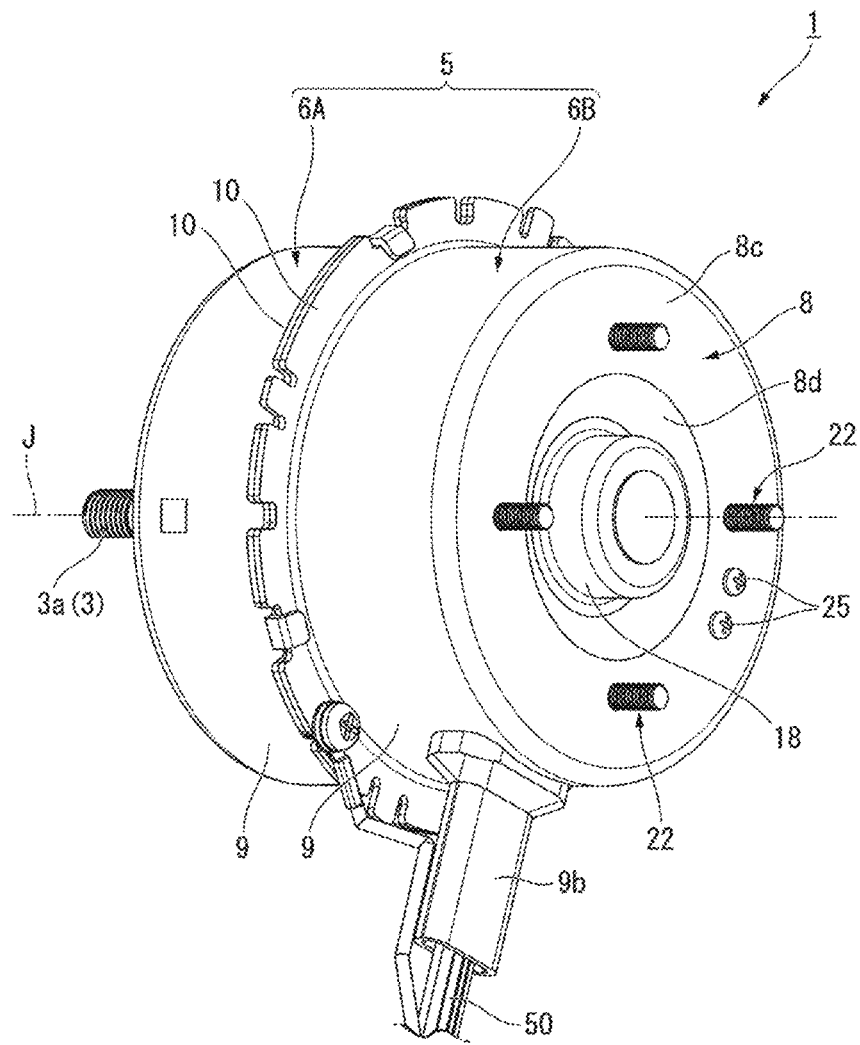
FIG. 2 is a perspective view illustrating a motor according to an example embodiment of the present disclosure.

As illustrated in FIGS. 2, 3, and 5, the screw member 25 fastens the bottom wall 8 of the second cup body 6B and the heat sink 21 to each other. The screw member 25 fastens and fixes the flat unit 8c of the second cup body 6B and the second end 21d of the heat sink 21 to each other. A plurality of screw members 25 are provided. The plurality of screw members 25 are circumferentially disposed away from each other in the bottom wall 8. The number of screw members 25 is two.

As illustrated in FIG. 3, the screw member 25 is disposed at the radial position outside the radial position of the stud bolt 22 in the bottom wall 8. The screw member 25 is disposed at the radial position outside a polygon having the stud bolts 22 as apexes in the bottom wall 8. In the example of the example embodiment, the screw member 25 is disposed closer the radial outside than a quadrangle having four stud bolts 22 as apexes.

The screw member 25 has a screw unit (not illustrated) and a head. The screw unit has a cylindrical shape extending in the axial direction. The screw unit includes a male screw on the outer circumference. The screw unit is inserted into the screw attachment hole of the bottom wall 8, and attached to the screw hole of the second end 21d. That is, the screw member 25 is fixed to the second end 21d. An outer diameter of the head is larger than that of the screw unit. The head is connected to the end on one side in the axial direction of the screw unit. The head contacts with the bottom wall 8 from one side in the axial direction. The head contacts with the bottom wall 8 from the outside of the motor. The head contacts with the flat unit 8c from one side in the axial direction. The head protrudes from the bottom wall 8 toward one side in the axial direction.

In the present example embodiment, the heat sink 21 pressing down the integrated circuit 20a of the substrate 20 toward the other side in the axial direction and the substrate receiving unit 31 supporting the substrate 20 toward one side in the axial direction are opposed to each other in the axial direction. Consequently, the warp of the substrate 20 is prevented even when the heat sink 21 pushes the substrate 20 during the assembly of the motor 1. The movement of the substrate 20 in the axial direction with respect to the binding pin 29 is prevented, and peeling of the solder 30 is prevented. Thus, the reliability of the solder 30 can be ensured.

In the example embodiment, the heat sink 21 and the inner circumferential-side substrate receiving unit 31*b* are disposed at positions where the heat sink 21 and the inner circumferential-side substrate receiving unit 31*b* overlap each other as viewed fin the axial direction. The inner circumferential-side substrate receiving unit 31*b* is located on the radial inside of the coil 27, so that a position where the substrate 20 is easily warped can be supported toward one side in the axial direction.

In the example embodiment, the insulating unit 28 includes the plurality of outer circumferential-side substrate receiving units 31*a* contacting with the outer circumference of the surface on the other side in the axial direction of the substrate 20. Thus, the warp in the outer circumference of the substrate 20 can be prevented. Because the surface on the other side in the axial direction of the substrate 20 is also supported at the radial position different from the position opposed to the heat sink 21 in the axial direction, the warp deformation of the substrate 20 along the radial direction is prevented.

In the example embodiment, the binding pin 29 is disposed between the outer circumferential-side substrate receiving units 31*a* adjacent to each other in the circumferential direction. For this reason, the binding pin 29 can easily be disposed close to one of the outer circumferential-side substrate receiving units 31*a* adjacent to each other in the circumferential direction. Relative movement in the axial direction between the portion of the substrate 20 supported by the outer circumferential-side substrate receiving unit 31*a* and the binding pin 29 can be prevented.

In the example embodiment, there are four sets of the coil lead wire 27*a* and the binding pin 29. The peeling of the solder 30 is prevented in each of the four sets of the coil lead wire 27*a* and the binding pin 29 used for the U-phase, the V-phase, the W-phase, and the neutral point.

The present disclosure is not limited to the example embodiment. For example, as described below, the configuration or the like can be changed without departing from the scope of the present disclosure.

In the above example embodiment, the first cup body 6A and the second cup body 6B are made of the sheet metal. However, the present disclosure is not limited to this configuration. For example, the first cup body 6A and the second cup body 6B may be made of aluminum die cast except for the sheet metal.

In FIG. 4, the rotor magnet 2*a* and the stator 4 may be accommodated in the first cup body 6A and the second cup body 6B instead of being accommodated in the first cup body 6A. However, when the rotor magnet 2*a* and the stator 4 are accommodated in the first cup body 6A as in the above example embodiment, more preferably the size of the motor 1 can be reduced in the axial direction while a disposition space of the capacitor mounted on the plate surface facing one side in the axial direction of the substrate 20 is ensured. A part of the substrate 20, the heat dissipation member 24, and the heat sink 21 may be located in the first cup body 6A.

The heat sink 21 may be fixed using an adhesive or the like instead of being fixed to the bottom wall 8 of the second cup body 6B using the screw member 25. However, the use of the screw member 25 shortens a manufacturing time to improve productivity as compared with the case of using the adhesive or the like. The heat dissipation member 24 may not be provided. For example, heat dissipation grease may be provided instead of the heat dissipation member 24.

The shape of the heat sink 21 is not limited to the configuration of the above example embodiment. For example, the heat sink 21 may has a simple rectangular parallelepiped shape. The heat sink 21 may have a polygonal columnar shape, a columnar shape, or the like. The heat sink 21 may include a plurality of fins in the outer circumferential surface facing in the direction orthogonal to the axial direction.

In the above example embodiment, the bent unit 21*e* and the second end 21*d* of the heat sink 21 and the inner circumferential-side substrate receiving unit 31*b* of the substrate receiving unit 31 are disposed at positions where the bent unit 21*e* and the second end 21*d* and the inner circumferential-side substrate receiving unit 31*b* overlap each other as viewed in the axial direction. However, the present disclosure is not limited to this configuration. In the present disclosure, the heat sink 21 and the substrate receiving unit 31 may be disposed at positions where the heat sink 21 and the substrate receiving unit 31 overlap each other as viewed in the axial direction. Thus, for example, the first end 21*c* of the heat sink 21 and the inner circumferential-side substrate receiving unit 31*b* of the substrate receiving unit 31 may be disposed at positions where the first end 21*c* and the inner circumferential-side substrate receiving unit 31*b* overlap each other as viewed in the axial direction.

Additionally, a combination of the configurations (components) described in the above example embodiment, modifications, and notes may be made without departing from the scope of the present disclosure, or additions, omissions, substitutions, and the like of the configuration can be made. The present disclosure is not limited to the above example embodiment, but is limited only by the scope of the claims.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
    a rotor including a motor shaft extending along a center axis;
    a stator opposed to the rotor with a gap in a radial direction;
    a substrate located on one side in an axial direction of the stator, the substrate including a plate surface, on which an integrated circuit is mounted, disposed while facing one side in the axial direction;
    a heat sink disposed on one side in the axial direction of the substrate to contact thermally with the integrated circuit; and
    a cover accommodating the rotor, the stator, the substrate, and the heat sink; wherein
    the stator includes:
        a stator core;
        a coil mounted on the stator core;
        an insulator assembly radially opposed to the coil; and a plurality of binding pins extending from the insulator assembly toward one side in the axial direction to axially penetrate the substrate, the binding pins including a coil lead wire wound around, the coil lead wire extending from the coil;

an end on one side in the axial direction of the binding pin and the coil lead wire are fixed to a surface facing one side in the axial direction of the substrate by solder;

the insulator assembly includes a substrate receiver contacting with the substrate from another side in the axial direction;

the heat sink is fixed to the cover;

another end in the axial direction of the heat sink presses down the integrated circuit toward the other side in the axial direction; and the heat sink and the substrate receiver are disposed at positions where the heat sink and the substrate receiver overlap each other as viewed in the axial direction.

2. The motor according to claim 1, wherein the insulator assembly includes an inner circumferential-side substrate receiver contacting with a surface on the other side in the axial direction of the substrate on an inner circumferential side of the coil; and the heat sink and the inner circumferential-side substrate receiver are disposed at positions where the heat sink and the inner circumferential-side substrate receiver overlap each other as viewed in the axial direction.

3. The motor according to claim 1, wherein the insulator assembly includes a plurality of outer circumferential-side substrate receivers contacting with an outer circumference of a surface on the other side in the axial direction of the substrate.

4. The motor according to claim 3, wherein the binding pin is disposed between the outer circumferential-side substrate receivers adjacent to each other in a circumferential direction.

5. The motor according to claim 1, wherein a number of coil lead wires of the coil is four; and a number of the binding pins is four.

* * * * *